(12) United States Patent
Barber et al.

(10) Patent No.: US 12,462,183 B2
(45) Date of Patent: *Nov. 4, 2025

(54) DECODING QUANTUM ERROR CORRECTION CODES

(71) Applicant: RIVERLANE LTD, Cambridge (GB)

(72) Inventors: Ben Andrew Barber, Cambridge (GB); Kenton Michael Barnes, Cambridge (GB)

(73) Assignee: RIVERLANE LTD, Cambridge (GB)

( * ) Notice: Subject to any disclaimer, the term of this patent is extended or adjusted under 35 U.S.C. 154(b) by 303 days.

This patent is subject to a terminal disclaimer.

(21) Appl. No.: 18/055,488

(22) Filed: Nov. 15, 2022

(65) Prior Publication Data

US 2024/0169246 A1    May 23, 2024

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ......... G06N 10/70; G06N 10/20; G06N 10/00
See application file for complete search history.

(56) References Cited

U.S. PATENT DOCUMENTS 11,901,915 B1 * 2/2024 Campbell ............ H03M 13/611
12,147,874 B2 * 11/2024 Barber ................... G06N 10/70
2021/0042650 A1 2/2021 Das et al.
2021/0124640 A1 4/2021 Nickerson et al.
2022/0198311 A1 * 6/2022 Delfosse ................ G06N 10/00
2022/0216884 A1 7/2022 Delfosse et al.
2022/0269963 A1 8/2022 Delfosse et al.

(Continued)

FOREIGN PATENT DOCUMENTS

WO    2019002934 A1    1/2019
WO    2022150079 A1    7/2022

OTHER PUBLICATIONS

UK Search report mailed May 17, 2024 in GB2310012.6.

(Continued)

*Primary Examiner* — Cynthia Britt
(74) *Attorney, Agent, or Firm* — MASCHOFF BRENNAN

(57) ABSTRACT

A computer-implemented method for use in decoding syndromes of a quantum error correction code, the syndromes comprising measurement data from a quantum computer comprising a plurality of syndrome qubits and a plurality of data qubits. The method comprises: processing the syndromes to identify defects; recording, in a data structure, respective locations for each defect; and determining a respective radius, for each respective defect, of a ball surrounding the respective location of the respective defect, and recording each respective radius with its respective location in the data structure, wherein each respective radius is determined by iteratively increasing a length of the respective radius until each respective radius defines a ball touching or overlapping at least one other ball surrounding another of the respective locations, such that each respective location belongs to a cluster consisting of an even number of the locations of the defects; wherein the data structure thereby enables decoding of the quantum error correction code.

15 Claims, 15 Drawing Sheets

(56) References Cited

U.S. PATENT DOCUMENTS

2024/0062092 A1* 2/2024 Delfosse ................ G06N 20/00
2024/0160988 A1* 5/2024 Barber .................. G06N 10/70

OTHER PUBLICATIONS

UK Search report mailed May 17, 2024 in GB2309996.3.
International Search Report and Written Opinion for International Application No. PCT/GB2023/051972 mailed Oct. 9, 2023.
International Search Report and Written Opinion for International Application No. PCT/GB2023/051971 mailed Oct. 12, 2023.
Xinyu Tan et al: "Scalable surface code decoders with parallelization in time", arxiv.org, Cornell University Library, 201 Olin Library Cornell University Ithaca, NY 14853, Sep. 19, 2022 (23 Pages).
Shilin Huang et al: "Fault-Tolerant Weighted Union-Find Decoding on the Torie Code", arxiv.org, Cornell University Library, 201 Olin Library Cornell University Ithaca, NY 14853 Apr. 9, 2020 (6 Pages).
Nicolas Delfosse et al: "Almost-linear time decoding algorithm for topological codes", arxiv.org, Cornell University Library, 201 Olin Library Cornell University Ithaca, NY 14853, Nov. 23, 2021 (12 Pages).
Das Poulami et al: "AFS: Accurate, Fast, and Scalable Error-Decoding for Fault-Tolerant Quantum Computers", 2022 IEEE International Symposium on High-Performance Computer Architecture (HPCA), IEEE, Apr. 2, 2022 (15 Pages).
U.S. Appl. No. 18/055,529, filed Nov. 15, 2022, Titled: Decoding Quantum Error Correction Codes, 32 pgs.

* cited by examiner

DECODING QUANTUM ERROR CORRECTION CODES

BACKGROUND

The present disclosure relates to apparatus, systems, methods and data structures for use in decoding quantum error correction codes.

SUMMARY

According to a first aspect, there is provided a computer-implemented method for use in decoding syndromes of a quantum error correction code, the syndromes comprising measurement data from a quantum computer comprising a plurality of syndrome qubits and a plurality of data qubits, the method comprising:

processing the syndromes to identify defects;

recording, in a data structure, respective locations for each defect; and determining a respective radius, for each respective defect, of a ball surrounding the respective location of the respective defect, and recording each respective radius with its respective location in the data structure, wherein each respective radius is determined by iteratively increasing a length of the respective radius until each respective radius defines a ball touching or overlapping at least one other ball surrounding another of the respective locations, such that each respective location belongs to a cluster consisting of an even number of the locations of defects;

wherein the data structure thereby enables decoding of the quantum error correction code.

Optionally, when at a particular iteration an odd number of the locations join a pre-existing cluster consisting of an even number of locations thereby forming a new cluster, the method may further comprise, at the next iteration, increasing the length of each radius of the new cluster.

Optionally, the length of a particular radius may be determined based on a number of times that the particular radius has been incrementally increased.

Optionally, the plurality of syndrome qubits may form a physical array with locations of the plurality of syndrome qubits corresponding to respective positions of the plurality of syndrome qubits in a graph representation of the array.

Optionally, the length of each radius may be determined according to a metric of the graph.

Optionally, the metric of the graph may vary within the graph.

Optionally, the metric of the graph may be an L1 metric.

Optionally, each iterative increase in the length of the respective radius may be an increase of half the edge length between nearest neighbor locations of the graph.

Optionally, the touching or overlapping of the ball with the other ball may be determined based on the sum of the radius length of the ball and the radius length of the other ball being at least equal to the graph distance between the ball and the other ball.

Optionally, the quantum error correction code may be a surface code.

Optionally, the surface code may be a rotated surface code or an unrotated surface code.

Optionally, decoding each of the one or more clusters may determine the location and type of error present on each data qubit containing an error.

Optionally, the method may perform error correction for each data qubit containing an error.

Optionally, the syndromes may comprise multiple rounds of syndrome measurement data, and the error syndrome bits may further comprise measurement data relevant to decoding measurement errors.

Optionally, the syndromes may correspond to a spatio-temporal graph and the one or more clusters may be configured to enable decoding of both data qubit errors and measurement errors.

According to a further aspect, there is provided a decoder apparatus for use in decoding a quantum error correction code from a quantum computer, the decoder apparatus configured to:

receive syndromes comprising measurement data from the quantum computer, the quantum computer comprising a plurality of syndrome qubits and a plurality of data qubits;

process the syndromes to identify defects;

record, in a data structure, respective locations for each defect;

determine a respective radius, for each respective defect, of a ball surrounding the respective location of the respective defect; and record each respective radius in association with its respective location in the data structure, wherein each respective radius is determined by iteratively increasing a length of the respective radius until each respective radius defines a ball touching or overlapping at least one other ball surrounding another of the respective locations, such that each respective location belongs to a cluster consisting of an even number of the locations of the identified syndrome qubits, and wherein the data structure thereby comprises one or more clusters of the locations of the defects, the one or more clusters for decoding the syndromes of the quantum error correction code.

Optionally, a quantum computer system may comprise the decoder apparatus, and the quantum computer system may be configured to decode the one or more clusters and to perform quantum error correction.

According to a further aspect, there is provided a data structure for use in decoding syndromes of a quantum error correction code, the syndromes comprising measurement data from a quantum computer comprising a plurality of syndrome qubits and a plurality of data qubits, the data structure comprising:

a record of respective locations of identified syndrome qubits, identified as adjacent to only an odd number of the data qubits and/or syndrome qubits having errors;

a record of a respective radius in association with each respective location, wherein each respective radius defines a ball touching or overlapping at least one other ball surrounding another of the respective locations, such that each respective location belongs to a cluster consisting of an even number of the locations of the identified syndrome qubits; and wherein the data structure thereby comprises one or more clusters of the locations of the identified syndrome qubits, the one or more clusters for decoding the syndromes of the quantum error correction code.

According to a further aspect, there is provided a data structure for use in decoding syndromes of a quantum error correction code, the syndromes comprising measurement data from a quantum computer comprising a plurality of syndrome qubits and a plurality of data qubits, the data structure comprising:

a record of respective locations of identified syndrome qubits, identified as adjacent to only an odd number of the data qubits and/or syndrome qubits having errors;

a record of a respective radius in association with each respective location, wherein each respective radius is determined by iteratively increasing a length of the respective radius until each respective radius defines a ball touching or overlapping at least one other ball surrounding another of the respective locations, such that each respective location belongs to a cluster consisting of an even number of the locations of the identified syndrome qubits; and wherein the data structure thereby comprises one or more clusters of the locations of the identified syndrome qubits, the one or more clusters for decoding the syndromes of the quantum error correction code.

Optionally, the record of the respective locations of the identified syndrome qubits may correspond to a graph representation of a physical array comprised by the plurality of syndrome qubits.

Optionally, the length of each radius may be determined according to a metric of the graph.

According to a further aspect, there is provided a computer program product comprising instructions configured, when executed by a decoder apparatus, to perform the method of any disclosure herein.

BRIEF DESCRIPTION OF THE DRAWINGS

Examples of embodiments of the present invention will now be described in detail with reference to the accompanying drawings, in which.

DETAILED DESCRIPTION

Quantum computing holds out the prospect of making possible computations that are, and will always remain, impossible using conventional classical computing technology. However, to enable quantum computers to solve practical computational problems that would otherwise be insoluble it will be necessary to perform quantum error correction, since the appearance of errors in quantum computers is essentially inevitable. Quantum computers that can do this may be described as fault tolerant.

A quantum processor unit can contain a combination of data qubits, used to store and manipulate the quantum information, and syndrome qubits that can be used to determine the presence or absence of errors that occur on the data qubits at any time, including during quantum data processing, and also measurement errors that occur during the syndrome qubit measurement process. Measurement of these syndrome qubits can generate a very large (potentially Terabytes per-second), real-time, flow of error correction data that needs to be processed to make quantum computing possible.

The data attained from measuring syndrome qubits is called the 'syndrome'. The process of decoding includes using the syndrome to determine which data qubits have been affected by errors and what types of error. Only then, is it possible to implement the necessary error corrections required for fault tolerant quantum computing. Decoding is therefore a critical process required to make practical quantum computing technically possible.

Decoding sufficiently quickly to keep pace with the flow of syndrome data is one of the key limiting factors for achieving fault tolerant quantum computation. Decoders that work by grouping syndrome bits into clusters, such as "Union-Find", are one of the leading proposals for fast and scalable decoders. There exist implementation proposals for these "clustering" decoders in dedicated hardware, in order to decode in real-time at the very high speeds required. The present disclosure provides a significant improvement to data structures that can be used in many clustering decoders, together with apparatus and methods for generating and using this new data structure to enable practical quantum computing.

In the following disclosure, the surface code will be used to provide specific examples of a quantum error correction code. However, it will be appreciated that many other types of quantum error correction code are possible, such as other topological quantum codes, bosonic codes, etc., which may also benefit from using the data structures and methods of the present disclosure.

Figure 1:
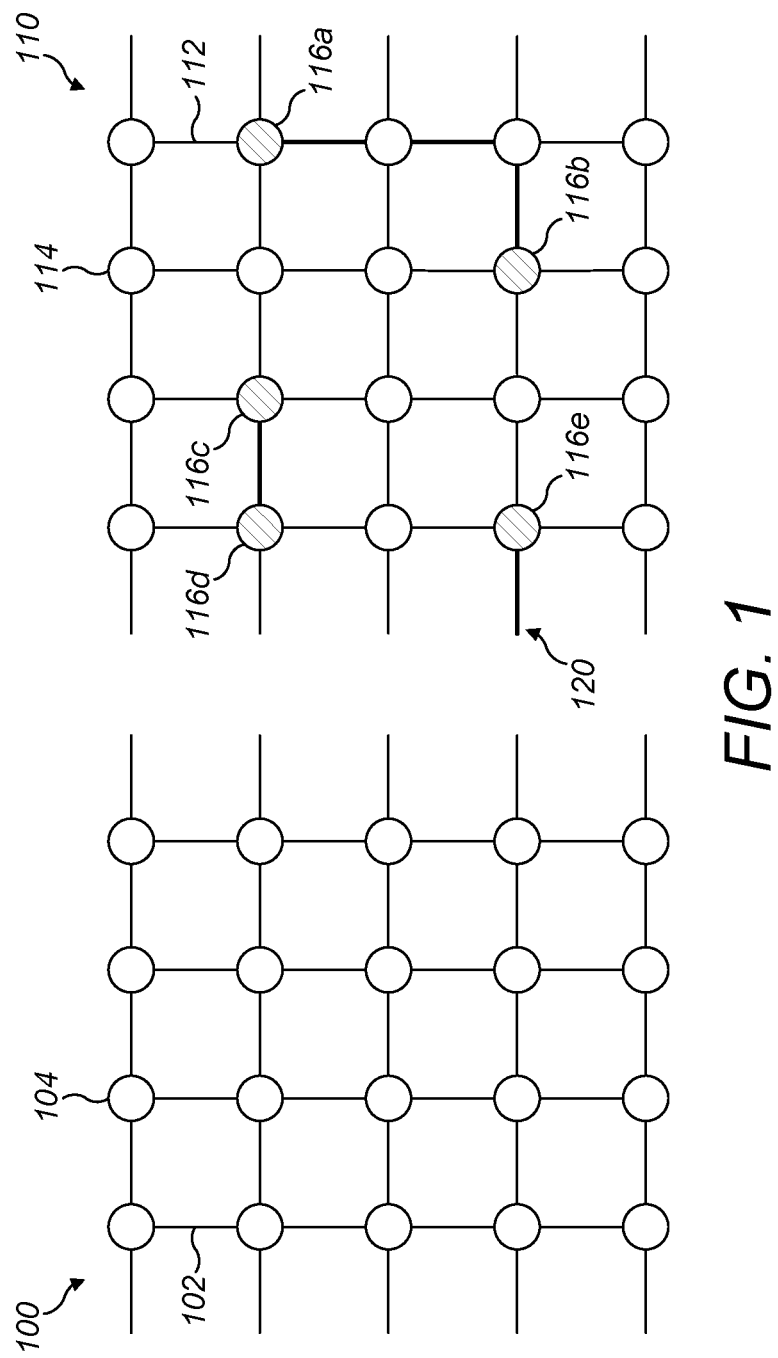
FIG. 1 shows an example of patches of surface code.

FIG. 1 shows two examples of surface code patches 100, 110 represented as graphs. Surface code decoding is a graph problem. Edges 102, 112 correspond to data qubits. Vertices 104, 114 correspond to syndrome measurement qubits. With no errors, syndrome qubits are in the |0⟩ state, as illustrated in the first surface code patch 100. An error on a data qubit edge flips the states of its endpoints from |0⟩ to |1⟩, or vice-versa. The end result is that syndrome measurement vertices are |1⟩ if there are an odd number of errors on the incident data qubit edges, and |0⟩ otherwise. The second surface code patch 110 shows five vertices 116a-e in the |1⟩ state.

Syndrome measurement vertices with the value |1⟩ may be referred to as error syndrome bits, which can arise where they are adjacent to an odd number of data qubits on which errors are present. The syndrome measurement data can be processed to identify the error syndrome bits contained therein and that identification can be used to determine 'identified syndrome qubits', being the actual physical qubits that have the |1⟩ value that indicates that an error has occurred somewhere in the system.

The description of error correction presented immediately above involves a perfect set of stabiliser measurements, decoding of the resulting syndrome, then physical correction of the determined Pauli errors. However, it will be appreciated by person skilled in the art that this describes a somewhat idealized picture and that error correction in practice can involve further subtleties as discussed below.

The reality of error correction can differ in that (i) measurements are not perfect, and (relatedly) (ii) that typically physically correcting errors after every round (if at all) is not necessarily required. This means that an error which flips the result of some stabiliser measurements will continue to flip the results of those measurements in subsequent measurement rounds. Decoding the resulting syndrome would result in a whole sequence of errors in the same place, repeating across time, which would need to be identified and corrected later. It is more efficient for errors to only affect the syndrome once. This can be achieved elegantly by only reporting differences in the syndrome (often called the difference syndrome which identifies difference syndrome bits). This means that a single data error will appear in only a single time slice of the decoding graph. This also means that a single measurement error will produce changes at two consecutive time steps, the first when the measurement error is made initially and the second when a subsequent correct measurement is made.

This has two delicate consequences. The first is that it is no longer really true that marked/identified vertices correspond to a particular measurement result such as a −1 eigenvalue or a $|1\rangle$ state. In this picture, they represent changes in that measurement from one state to the other. For this reason "$|1\rangle$ vertex" is not necessarily the best name for this idea, when the more complex picture of error correction is considered. A relatively standard name for a marked vertex in a decoding graph is a defect. Errors thus create a pair of defects, and the objective is to match them up. In some examples, an odd number of defects may exist in the code, in which case the matching process can be completed using a so-called 'artificial' defect, which exists at the boundary of the code. It will be appreciated that artificial defects are particular examples of defects.

The second consequence is that time slices of vertices no longer correspond to a time at which measurements were made: vertices are between consecutive rounds of measurement; equivalently, rounds of measurement are between layers of vertices, i.e. are associated with vertical edges of the graph. However, it will be appreciated that embodiments of the present invention can advantageously be applied to both simplified and more complex error correction scenarios. In the latter, more complex scenario, error syndrome bits are examples of difference syndrome bits.

The decoding problem does not generally have a unique solution, therefore the objective is to find the most likely explanation for an observed set of syndrome measurements. An explanation looks like a set of edge-disjoint paths connecting pairs of syndrome vertices that measured $|1\rangle$, as shown in a first example pair 116a-b of vertices and a second example pair 116c-d of vertices. The most likely explanation is the set of paths with shortest total length. Finding the shortest set of paths connecting pairs of syndrome vertices that measured $|1\rangle$ can be expressed as a minimum weight perfect matching problem, so this approach is known as 'MWPM' decoding.

The edges (data qubits) along the boundary of the surface code are only measured by one syndrome measurement qubit. The other endpoint of these edges is an abstract boundary vertex 120 (the same vertex for every boundary edge) whose state is not measured physically but can be inferred from the requirement that the total number of $|1\rangle$ measurements must be even.

Figure 2:
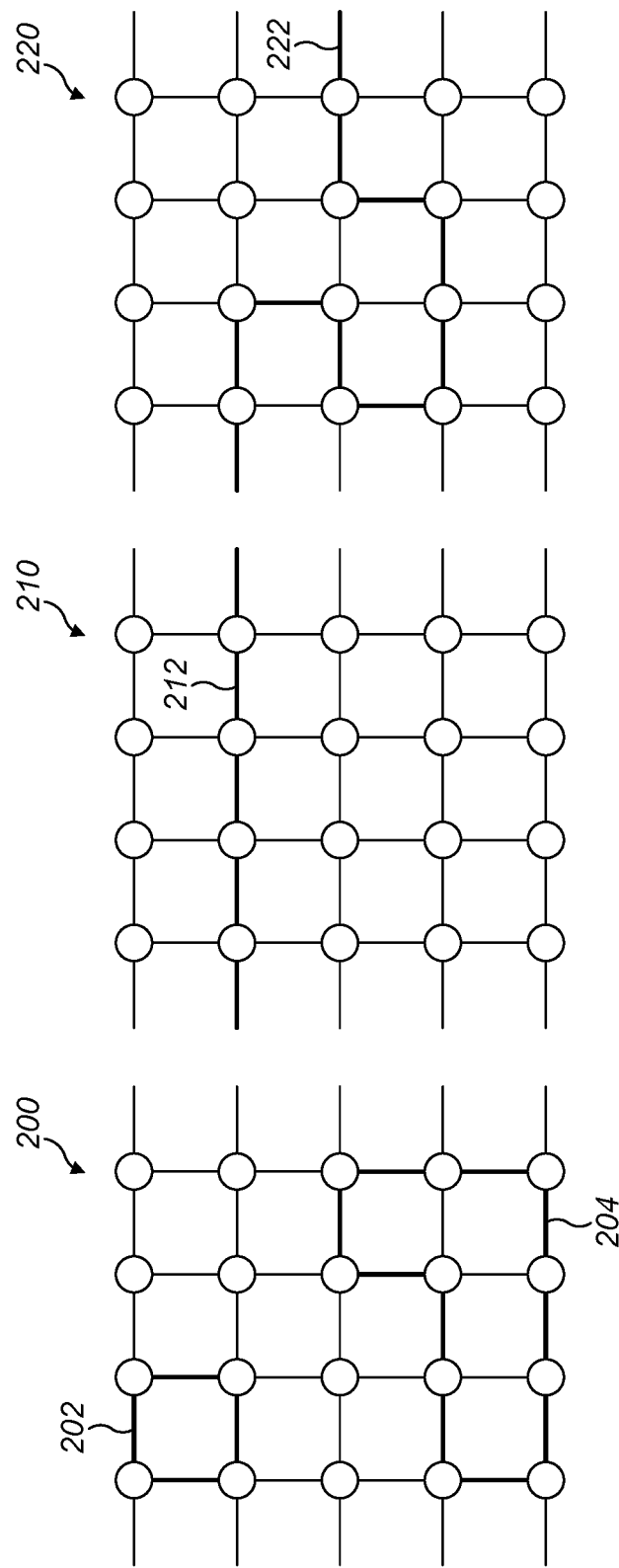
FIG. 2 shows an example of patches of surface code containing errors.

FIG. 2 shows three further surface code patches 200, 210, 220. Some sets of errors are undetectable. A closed loop of errors 202, 204 has an even number of errors at every vertex, so every syndrome qubit will be measured as $|0\rangle$, which would also be consistent with the absence of any errors. These errors are called stabilisers because they are not really errors at all, rather they can be said to fix the state of the data.

A continuous path of errors 212, 222 stretching from the left boundary to the right boundary also has an even number of errors at every measured vertex. These errors are called logical operations, and do affect the state of the data. The number of edges on the shortest path between the boundaries is called the distance of the code, which is 5 in the case of the surface code patches 200, 210, 220 of FIG. 2.

Figure 3:
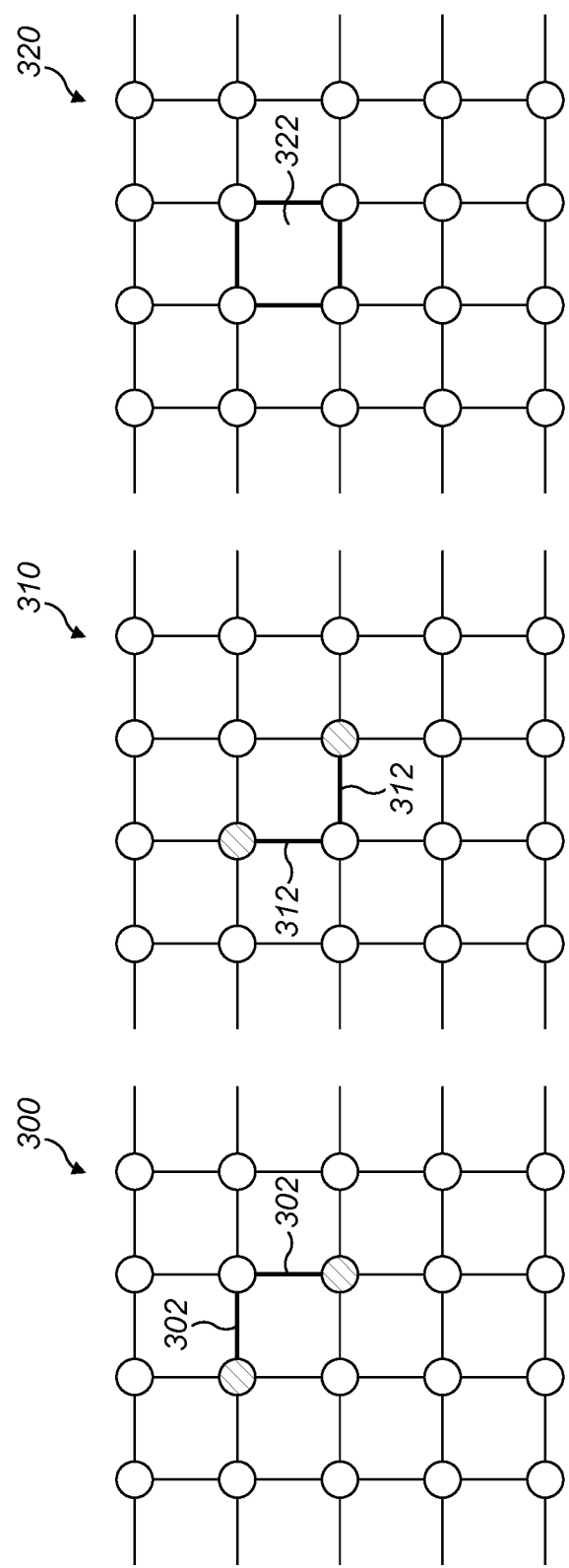
FIG. 3 shows an example of patches of surface code containing equivalent errors.

FIG. 3 shows three surface code patches 300, 310, 320. The existence of stabilisers means that there is not one unique correction for any given error because any two corrections that differ by stabilisers are equivalent. For example, a first interpretation 302 of a pair of $|1\rangle$ vertices is equivalent to a second interpretation 312 of the same pair of $|1\rangle$ vertices, because these interpretations differ by a stabiliser 322. This means that MWPM is not solving exactly the right problem; a perfect decoder would find the most likely explanation of a syndrome where the probabilities of all the equivalent explanations that differ by stabilisers are summed. However, when the physical error rate is small the dominant terms in that sum come from the shortest corrections, so MWPM can provide a good approximation. There are polynomial time algorithms for solving MWPM, but they are too slow to perform decoding in practice, for a real-world quantum computer.

Union-Find is an alternative decoding algorithm that runs in almost linear time (using a so-called "union-find" data structure) and has comparable accuracy to MWPM. The idea of Union-Find is to group $|1\rangle$ vertices into local clusters. How a correction is implemented within a cluster is unimportant, as different choices only differ by stabilisers.

FIGS. 4a-e show a series of graphs 410, 420, 430, 440, 450 of unrotated surface code with $|1\rangle$ vertices (illustrated as enlarged crosshatched dots at the relevant vertices) at the same positions for each graph (where each position is given a similar reference numeral in successive graphs). Each graph shows the evolution of a clustering process, conducted according to the Union-Find algorithm, designed to cluster the $|1\rangle$ vertices together into a set of decodable clusters.

Figure 4A:
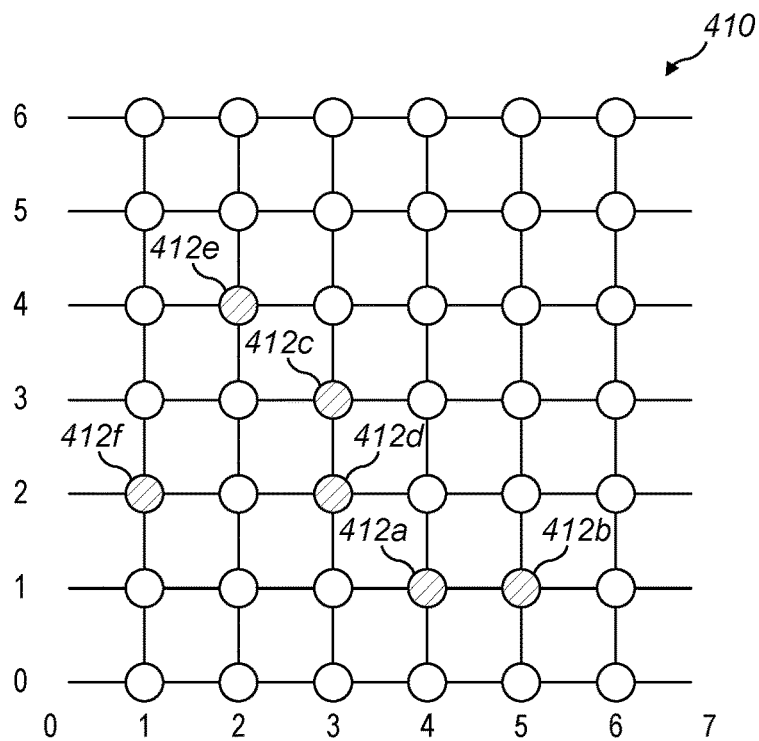
FIGS. 4a-e show an example of a process for decoding a patch of surface code using a Union-Find decoder.

FIG. 4a shows a first graph 410. The Union-Find algorithm begins by placing each $|1\rangle$ vertex in its own individual cluster 412a-f. For a cluster to be correctable, it needs to contain an even number of $|1\rangle$ vertices. In each iterative round of the process, each cluster containing an odd number of $|1\rangle$ vertices is extended outwards by a half-edge of the graph.

Figure 4B:
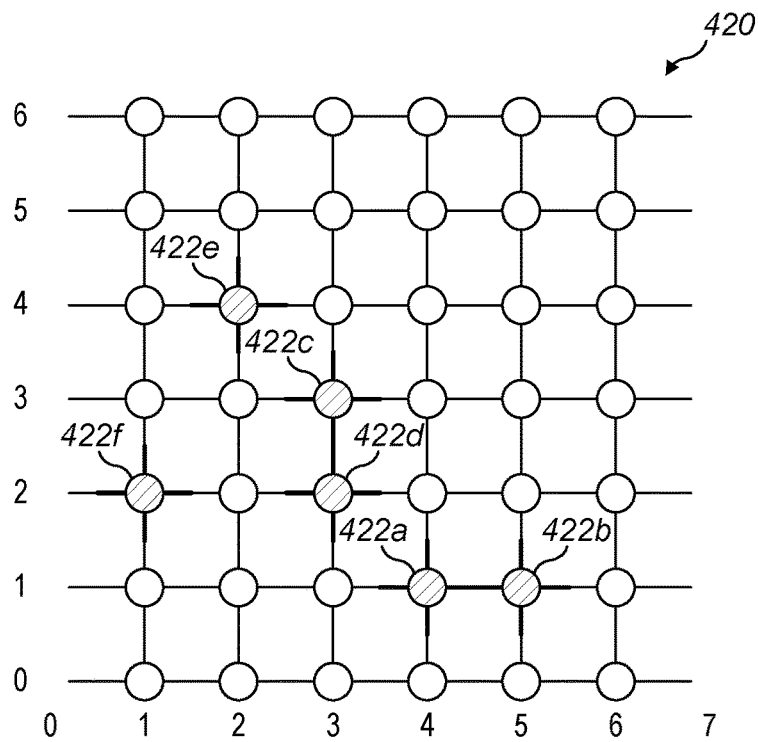

FIG. 4b shows a second graph 420, in which the algorithm extends vertices 422a and 422b by a half-edge in all directions which results in these clusters growing into each other and merging to form a clustered pair of vertices. Similarly, vertices 422c and 422d merge to form a pair. However, vertices 422e and 422f remain isolated and thus remain part of cluster containing only the single vertex concerned.

Figure 4C:
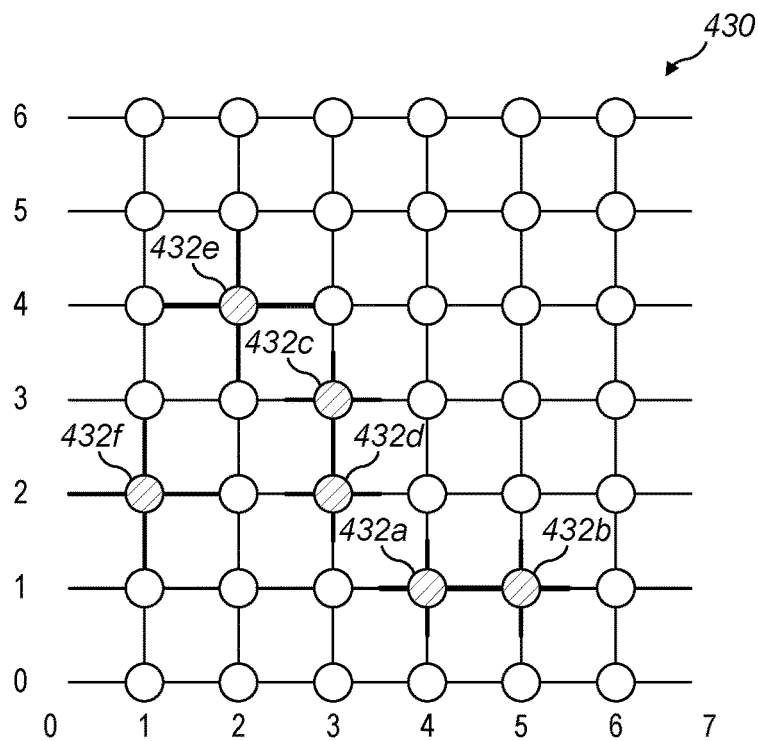

FIG. 4c shows a third graph 430 in which the process is repeated, with half-edge growth steps applied to the odd clusters 432e and 432f to enable clusters to merge until all clusters are even, although, at this step, neither of these vertices 432e, 432f merge with any others. The even clusters formed at the second graph 420 do not grow in the third graph 430 because they contain an exactly even number of |1⟩ vertices.

The boundary vertex on each side is an optional |1⟩ vertex (the abstract boundary vertex whose state can be inferred from parity can be considered as the sum of the left and right boundary vertices, so nothing need be determined about either of them individually). Therefore, the cluster 432f that has reached a boundary will not grow further because it has reached the boundary.

Figure 4D:
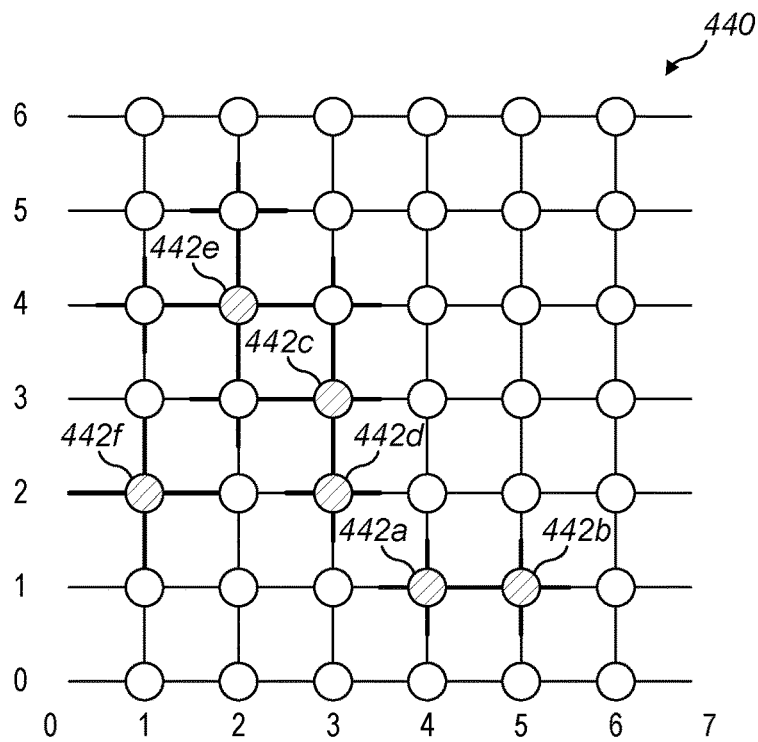

FIG. 4d shows a fourth graph 440 in which a remaining single vertex cluster 442e grows and merges to form an enlarged cluster also including the existing cluster 442c, 442d.

Figure 4E:
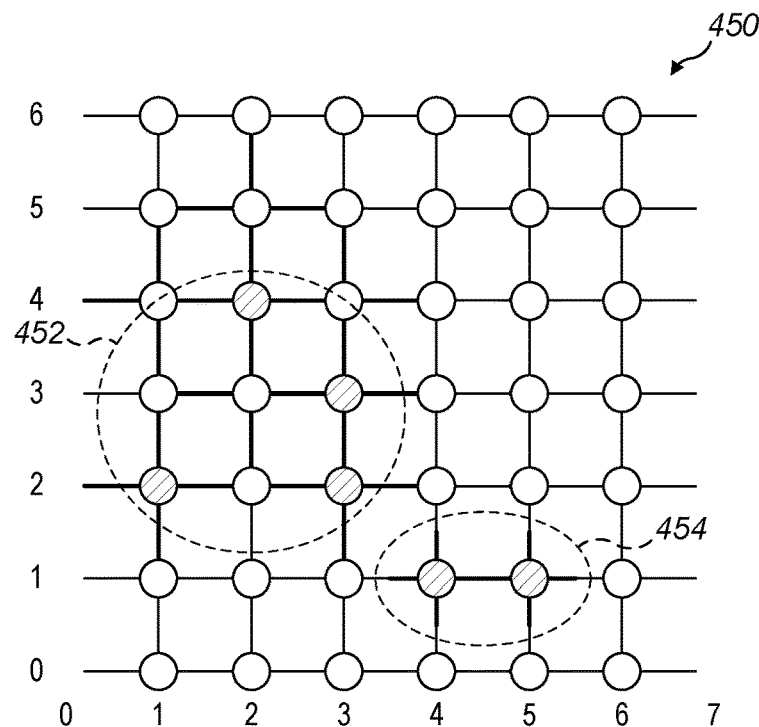
Figure 5A:
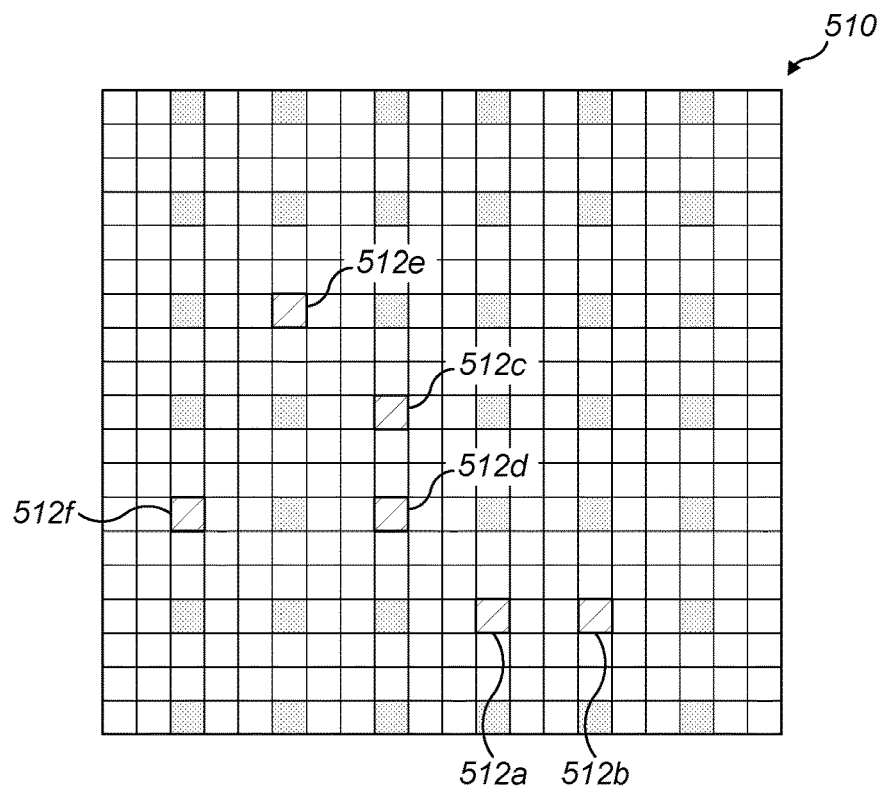
FIGS. 5a-e show cluster representations for a decoding example equivalent to that of FIGS. 4a-e.
Figure 5B:
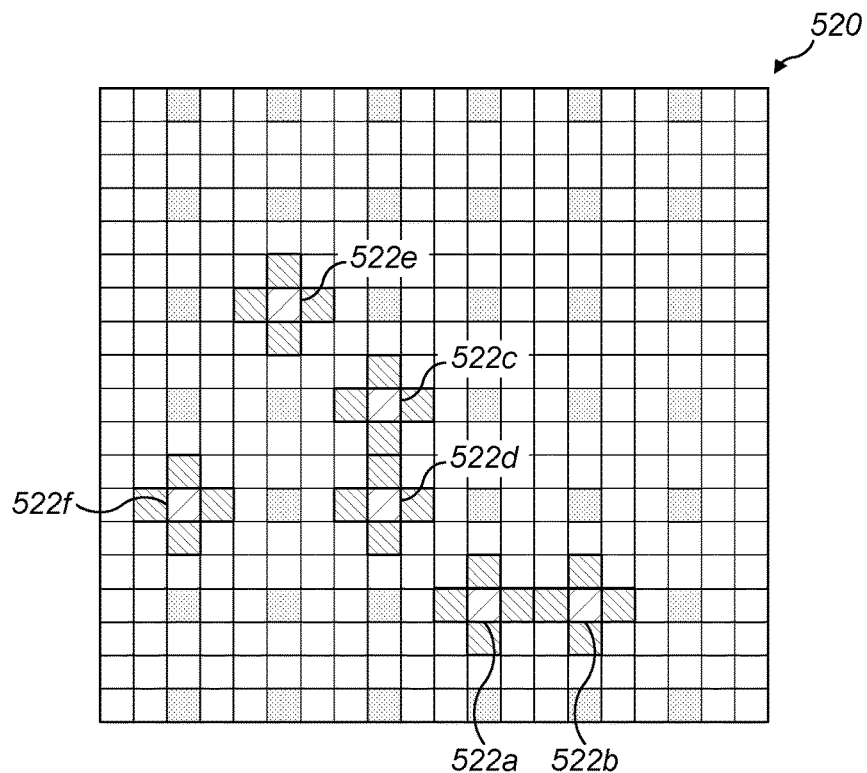
Figure 5C:
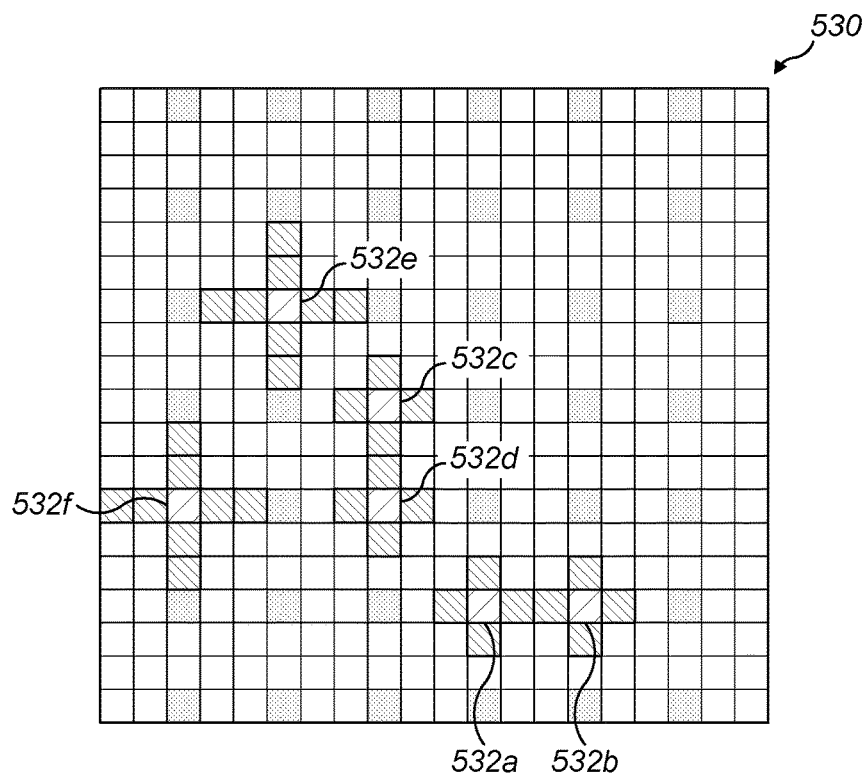
Figure 5D:
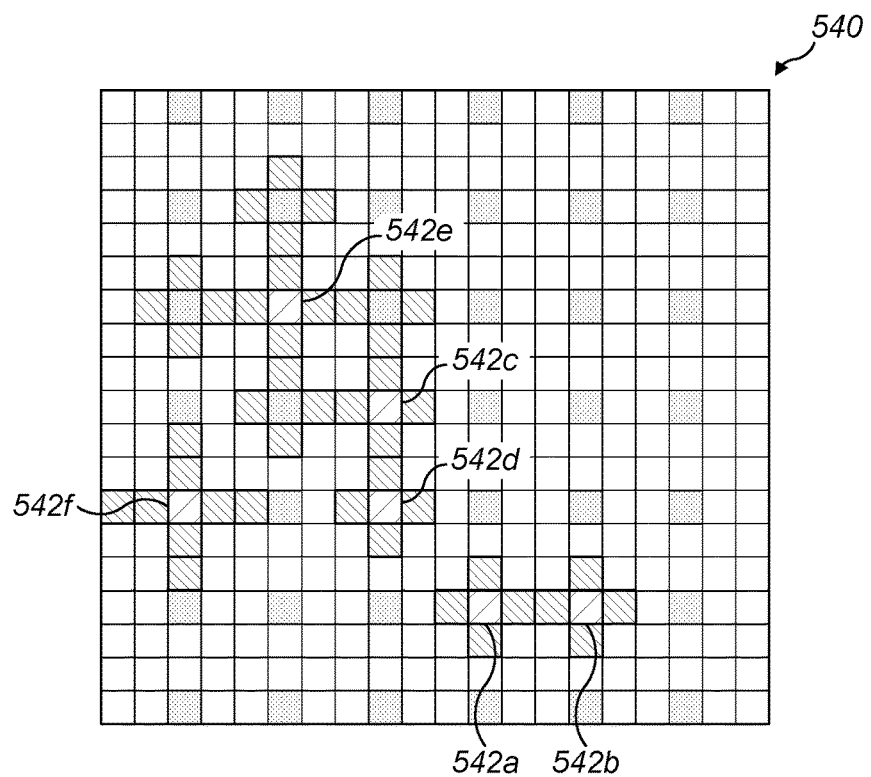
Figure 5E:
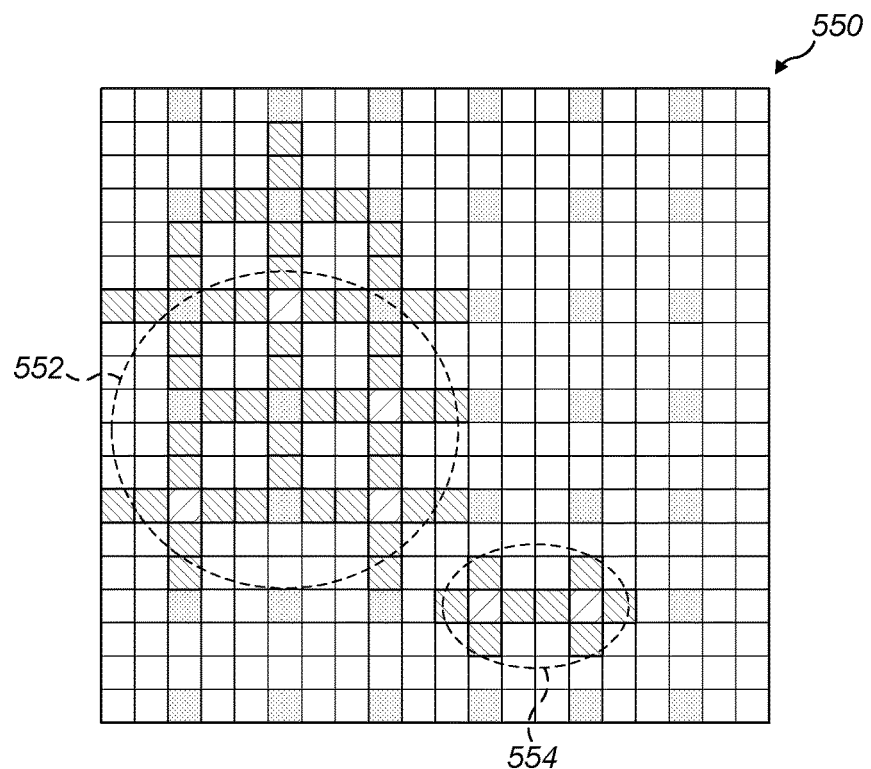

FIG. 4e shows a fifth graph 450 in which all |1⟩ vertices have been formed into a first even cluster 452 of exactly four |1⟩ vertices and a second even cluster 454 of exactly two |1⟩ vertices. The clustered vertices can now be decoded by any conventional means.

FIGS. 5a-e show cluster representations of the Union-Find procedure discussed above in relation to FIG. 4. Corresponding features have been given corresponding reference numerals and may not necessarily be discussed further here. A first cluster representation 510 shows |1⟩ vertices 512a-e distributed as in FIG. 4. Each square of the cluster representation 510 can be represented in a memory using a single bit, which records either the presence or absence of vertex relevant to forming clusters.

A second cluster representation 520 shows two single-vertex clusters 522e, and 522f and two two-vertex clusters (comprising 522a, 522b and 522c, 522d respectively) that exist after a single growth step. A further grow step shows, in a third cluster representation 530, that the clustering of the previous step remains unchanged. A yet further growth step, shown at a fourth cluster representation 540, shows that the clustering procedure has evolved to include a three vertex cluster 542c-e while the other cluster remain unchanged. The three vertex cluster 542c-e will grow at the next step since it contains an exactly odd number of vertices. A final cluster representation 550 shows that the clustering process is complete, with all |1⟩ vertices belonging to one of two even clusters, a cluster of four |1⟩ vertices 542 and a cluster of two |1⟩ vertices 544.

Standard union-find data structures record the geometry of each cluster as shown at each step of FIG. 5a-e. The conventional approach is to use memory to record whether or not there has been any growth along each half-edge adjacent to each vertex, as discussed above (subsequent to which a traversal algorithm can be used to determine which half-edges belong to which clusters). This leads to a memory requirement scaling in accordance with the total number of vertices, i.e., the total number of syndrome qubits. However, using one bit of classical memory to represent each half-edge is wasteful, as explained further below.

Figure 6:
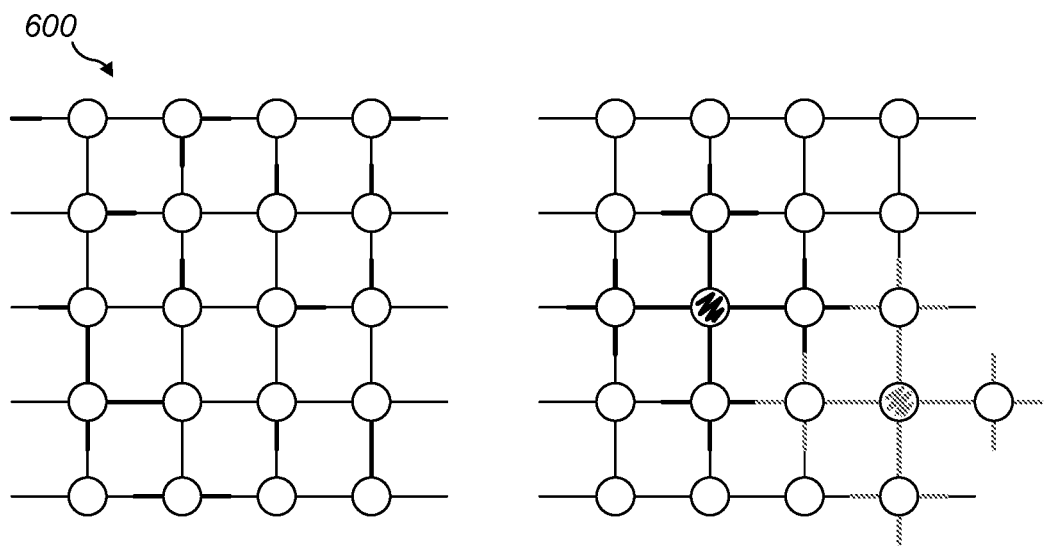
FIG. 6 shows an example of how memory can be used for a random scattering of edges corresponding to a typical memory state and a contrasting ordered state corresponding to Union-Find decoding.

FIG. 6 shows two surface code patches 600 where most possible states of a memory using a standard Union-Find method represent random scatterings of half-edges on the left that do not correspond to running a Union-Find decoder with maximum efficiency, while a conventional Union-Find decoder approach is shown on the right.

By contrast, a Union-Find cluster can be conceptualized, according to the present disclosure, as a union of balls centred at each |1⟩ vertex, the radius (in the graph metric) of each ball being determined by the number of times that each |1⟩ vertex was included in a cluster that has grown because it contained an odd number, in total, of |1⟩ vertices at any given iteration of the cluster identification process.

According to the present disclosure, clusters can be represented using precisely this information, i.e., co-ordinates (or more generally a location) and a radius for each |1⟩ vertex in a given cluster.

For each |1⟩ vertex, it is possible to record the number of times that it is present in a cluster that grows in size. Growing a cluster means incrementing the length of the radii for each vertex in that cluster. Detecting whether initially separate clusters have merged as a result of a single incremental increase requires checking pairs of |1⟩ vertices to determine if their respective balls have grown into each other or are touching each other; that is, if the first radius plus the second radius is at least twice the graph distance between the respective |1⟩ vertices, then they are touching or overlapping and hence part of the same cluster. In FIGS. 7 and 8a-c (discussed below) all of the radius growth amounts are scaled by 0.5 so that the comparison is against the graph distance between nearest neighbor vertices, which is 1.

Figure 7:
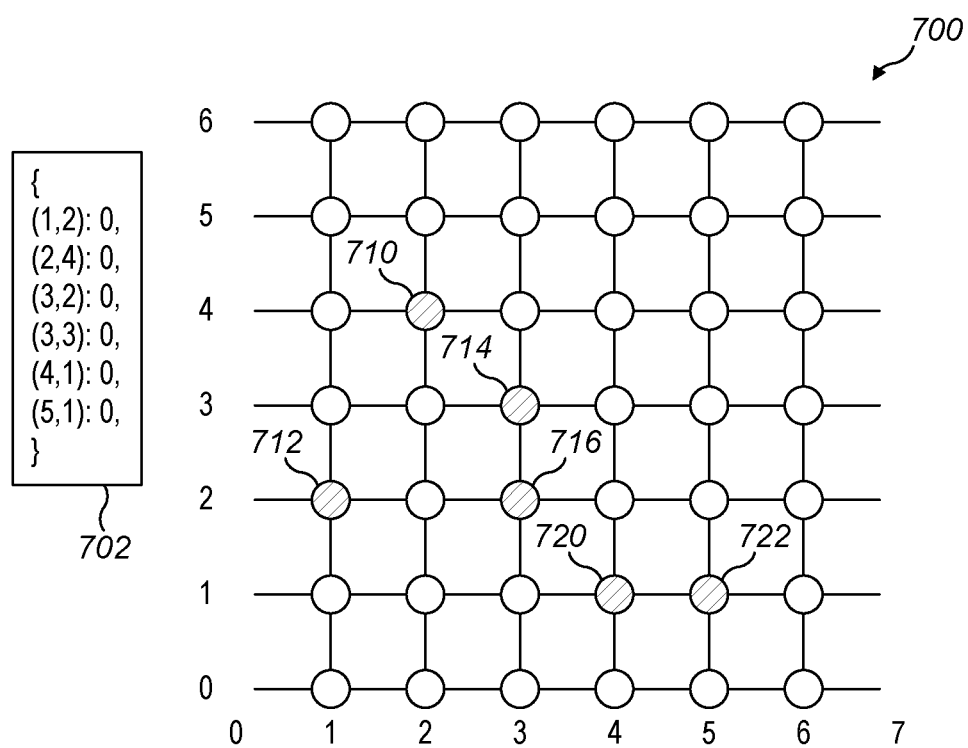
FIG. 7 shows an example embodiment of a data structure of the present disclosure and an associated graph representation of a surface code patch.

FIG. 7 shows an unrotated surface code patch in graph form 700 and a corresponding data structure 702. The graph shows the locations for |1⟩ vertices 710, 712, 714, 716, 720, 722 (which are depicted as enlarged crosshatched vertex dots). The data structure 702 records the location of each vertex, for example the first |1⟩ vertex 710 has location (2,4) in the graph. It will be appreciated that any system may be used to encode the location, such as a co-ordinate system that indexes the graph (as here) or any other co-ordinate system or any means of encoding values within any co-ordinate system. Further, in other examples, the location could refer to the actual physical location in 2- or 3-dimensional space of the relevant qubits.

The data structure 702 also records the radius of the ball surrounding each vertex, which in this initial state is 0 for all cases. Hence, for the first vertex 710 the data structure records the entry "(2,4):0" (the other |1⟩ vertices being recorded correspondingly).

FIGS. 8a-d show the evolution of the present cluster determination method as applied to the |1⟩ vertices illustrated in FIG. 7.

Figure 8A:
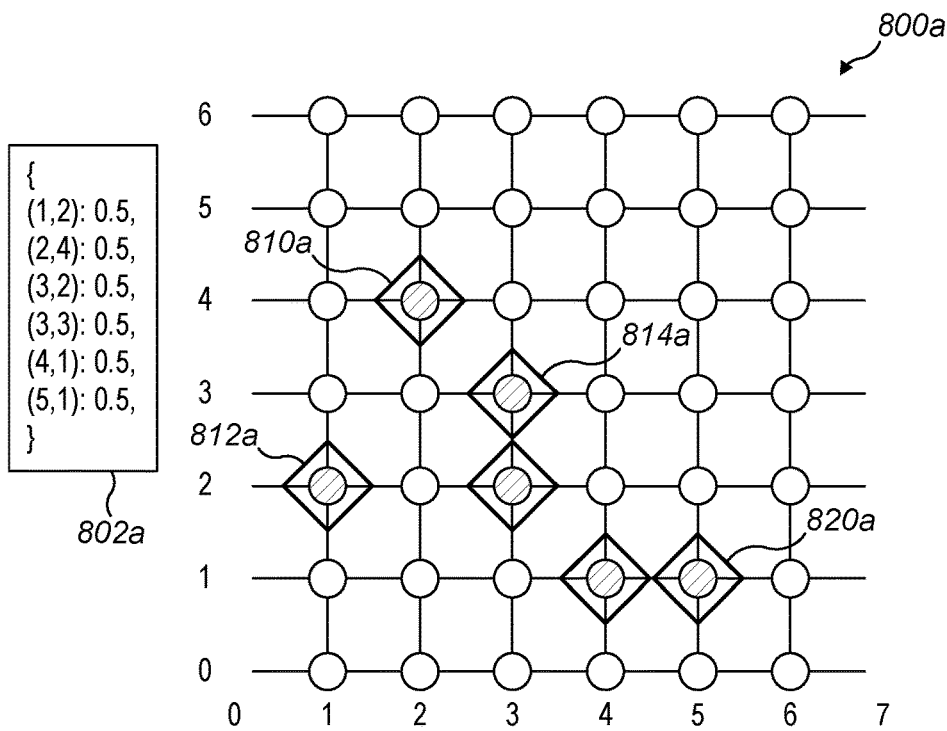
FIGS. 8a-d show an example embodiment of a decoding method, applied to the surface code patch of FIG. 7, and the associated data structures.

FIG. 8a shows a surface code patch 800a after a first iteration in which each cluster (of FIG. 7) is grown by a single unit, corresponding to a half-edge of the graph. Each ball that surrounds each |1⟩ vertex is shown as a square shape as the norm used to define the shape of each ball is the $L_1$ norm on a vector space corresponding to the graph (which may equivalently be described as the graph metric on the square grid). (It will be appreciated that if the conventional Euclidean $L_2$ norm was used instead, then each ball would be circular, and further that the term 'ball' is used in its standard mathematical sense of being an N-dimensional region of an N-dimensional space or graph, the region being within a constant distance (or radius) from a single point, the distance measured using any appropriate norm defined on the N-dimensional space or graph.) After this first increase in radius the code patch 800a has four clusters: two single vertex clusters 810a, 812a and two (even) two-vertex clusters 814a, 820a. The associated data structure 802a records the location in the graph of each vertex around which each ball is constructed and its associated radius, which after only one iteration is 0.5 for each ball. The balls surrounding the vertices of the first two-vertex cluster 814a can be said to touch in this case as they coincide half way between vertex positions (3,2) and (3,3). In other examples, balls may instead overlap by coinciding throughout a finite volume rather than simply coinciding at a point, or as a further alternative they may meet along a line within a three-dimensional graph.

Figure 8B:
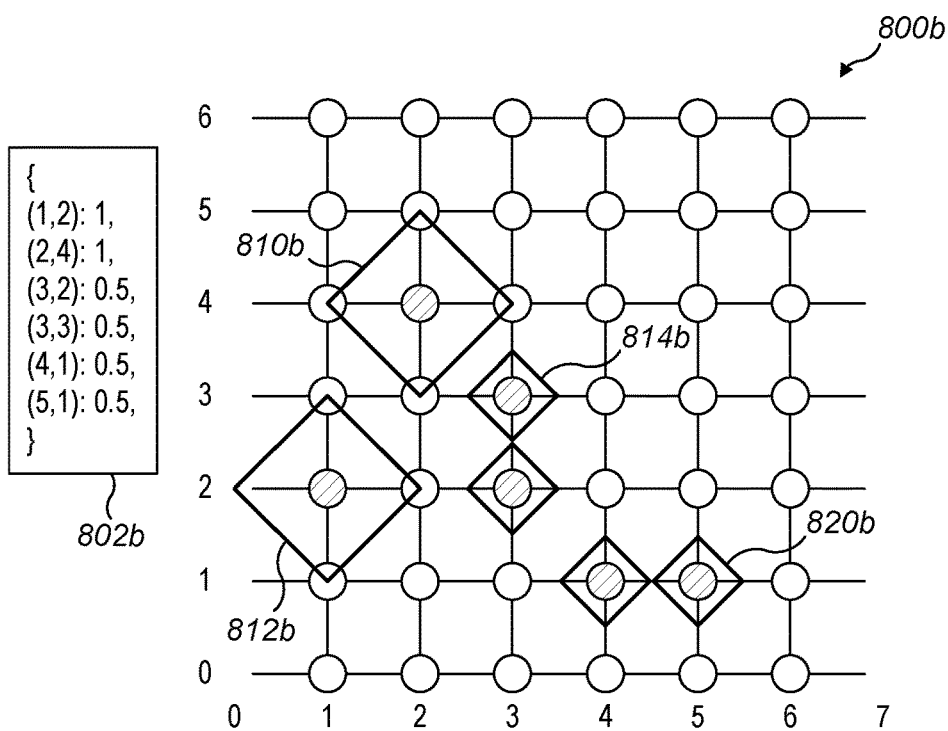

FIG. 8b shows the surface code patch 800b after a second iteration. The previously established even clusters 814b, 820b do not increase in radius. However, the single vertex clusters 810b, 812b both increase in radius to a length of 1. The number of clusters remains the same at this iteration and the data structure 802b records the state of the clusters.

Figure 8C:
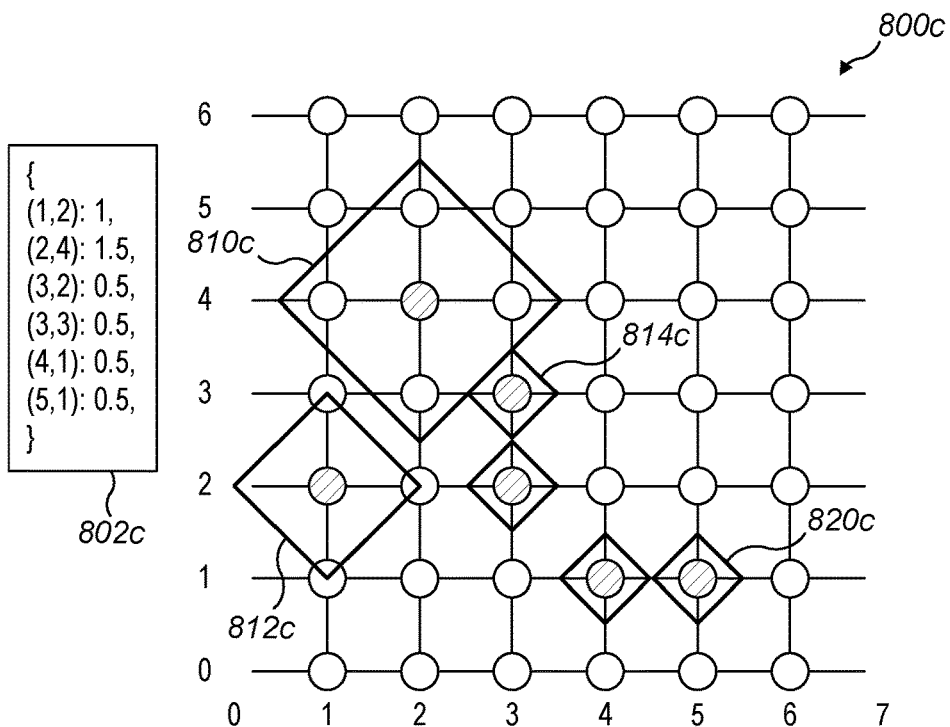

FIG. 8c shows the surface code patch 800c after a third iteration. The previously established even clusters 820c do not increase in radius but the previous single vertex cluster 810c increases in radius to 1.5 and thereby form an odd-cluster of three |1⟩ vertices with the formerly even two-vertex cluster 814c. Conversely, the single vertex cluster 812c does not increase in size as it has reached the boundary of the graph at co-ordinate 0.2 and will, similarly, not increase in future iterations for the same reason.

Figure 8D:
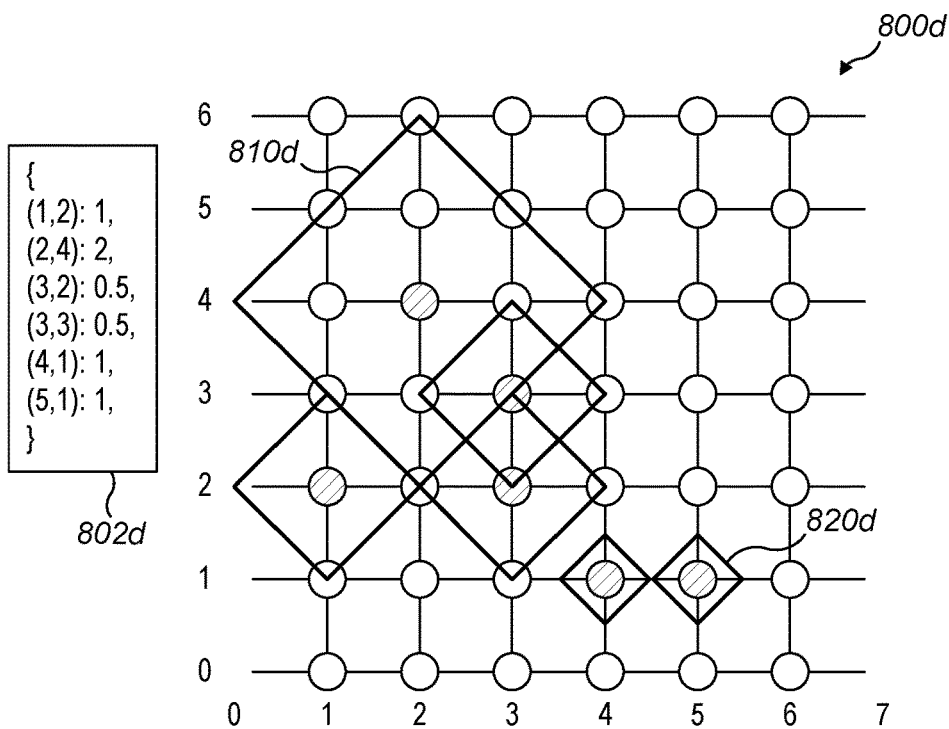

FIG. 8d shows the surface code patch 800d after a fourth iteration. Each vertex ball of the former three-vertex cluster has increased in radius by a half-edge resulting in a single cluster 810d of exactly four vertices. The previously formed two-vertex cluster 820d remains unchanged. This completes the clustering process by forming all |1⟩ vertices into even clusters, the locations and geometries of which are efficiently recorded in the associated data structure 802d. The data structure 802d can now be used to decode the syndromes of the quantum error correction code, that is the surface code patch 800d, by any suitable method, which can ultimately enable the performance of quantum error correction.

The standard union-find data structure is an efficient way to represent the current state of a sequence of merge operations on an initial set of objects, here the initial single-vertex clusters. To update, or determine, in which cluster a vertex belongs, such standard union-find data structures can be used. The Clustering Union-Find data structures disclosed herein 802a-d can efficiently represent the internal structure of the clusters.

Any Union-Find type decoding algorithm can move back and forth between updating the standard union-find data structure and the Clustering Union-Find data structure. Thus, these two data structures evolve together in parallel, each informing how the other should change at each step.

It will be appreciated that, as a matter of generality, if a single, or any odd number of |1⟩ vertices join an existing even cluster, then that newly formed cluster will have an odd number of |1⟩ vertices and consequently all of the balls surrounding the vertices of that newly formed odd-cluster will increase in radius at the next iteration (apart from any ball that has already reached a boundary).

The memory requirement of the present cluster representation scales with the number of |1⟩ vertices in the syndrome, and not with the number of syndrome qubits, as per previous representations. Consequently, the effect of using this representation is to provide a more efficient data structure to store information about the shape of clusters. This advantageously enables simplification of hardware used to implement a decoder based on this data structure. This simplification of hardware improves performance, lowers memory requirements and enables parallelism by reducing contention to memory, which all provide clear technical advantages for performing fault-tolerant quantum computing.

Figure 9:
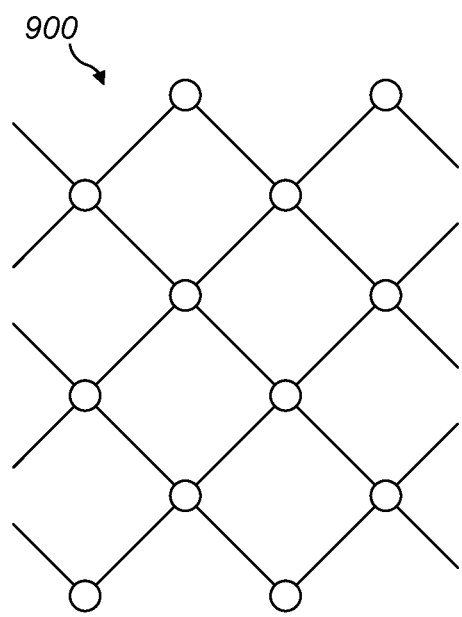
FIG. 9 shows an example of a rotated surface code patch.

The representation and associated data structures of the present disclosure can advantageously be used independently of the underlying graph. The graphs presented in FIGS. 7 and 8a-c, discussed above, are for the unrotated surface code. Other graphs for which this technique can be useful include the rotated surface code, such as that shown schematically by the graph 900 in FIG. 9.

Figure 10:
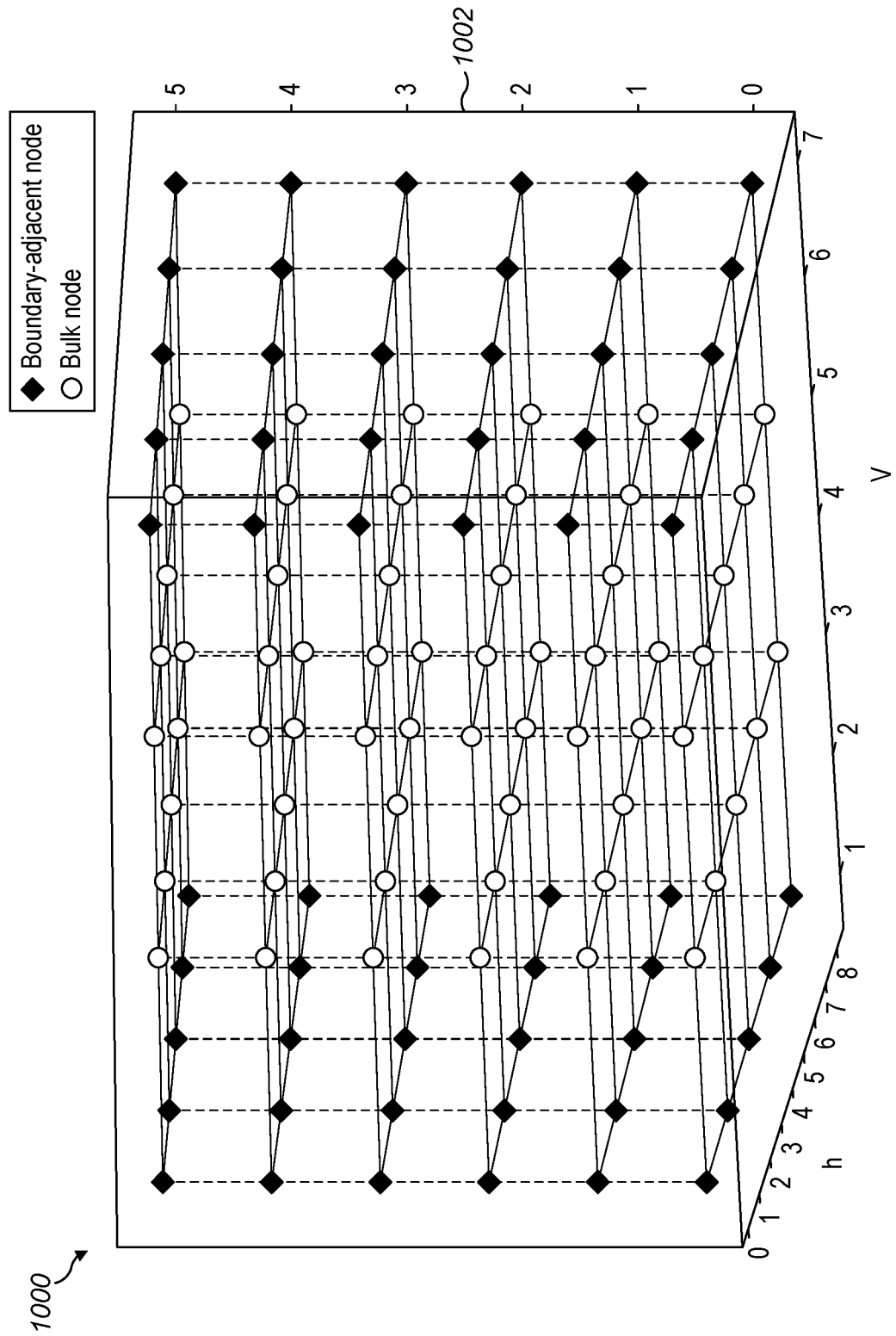
FIG. 10 shows an example of a 3D unrotated surface code graph with measurement noise.

FIG. 10 shows a three-dimensional version of the unrotated surface code 1000, which includes multiple rounds of syndrome measurement to detect measurement errors. Each round occurs at a separate time and thus the surface code 1000 in this case forms a spatio-temporal graph. Each round extends horizontally with successive rounds indexed on the vertical (time) axis 1002 from 0 to 5. The syndrome extraction circuitry is otherwise assumed to be perfect in the sense of exhibiting "phenomenological noise" only.

Figure 11:
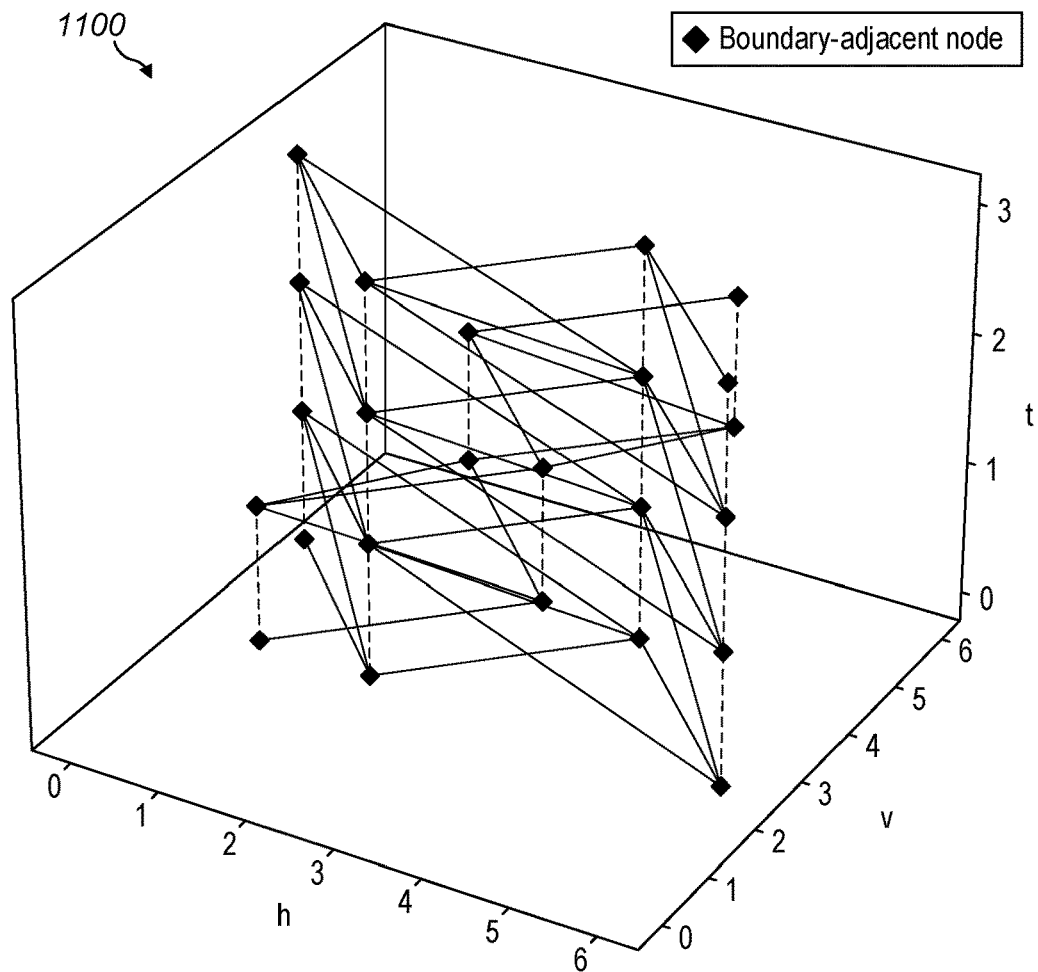
FIG. 11 shows an example of a 3D rotated surface code graph with full circuit level noise.

FIG. 11 shows a three-dimensional version of the rotated surface code that includes full circuit level noise 1100. The diagonal edges represent other error processes that can be visible in the syndrome, e.g., "hook errors" arising from circuit-level noise, which is a noise model in which the errors introduced by the circuitry for measuring syndromes are included. Similar edges could be added to the graph in FIG. 10.

By default, the metric on a graph may define that all edges have length 1. However, it will be appreciated that different graph edges can have different lengths, which can represent the probability of an error being present on each edge. More likely error locations can be represented by shorter edges, such that the probability of those errors occurring may increase more rapidly. These variable weights could be represented by integers or floating point numbers. The amount that a radius can grow in each iteration can therefore be an integer or floating point number. In all of these cases, the data structure of the present disclosure and the associated methods and apparatus can advantageously be employed to enable fault tolerant quantum computing to be implemented in practice.

Figure 12:
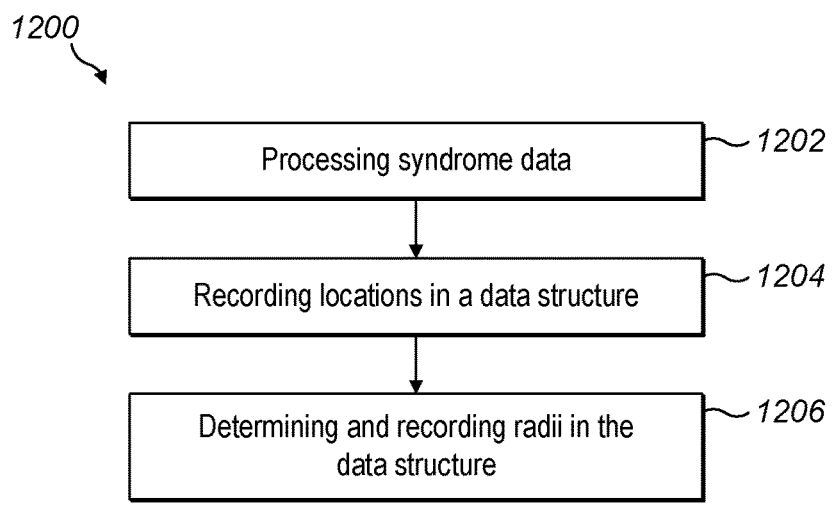
FIG. 12 shows an example embodiment of a method for use in decoding syndromes of a quantum error correction code.

FIG. 12 shows a flow chart 1200 of a method for use in decoding syndromes of a quantum error correction code. In a first step 1202, syndrome data is processed to identify defects corresponding to a |1⟩ state of the relevant syndrome qubit. In a second step 1204, the locations of each defect are recorded in a data structure. In a third step 1206, the radii associated with each of the locations are determined, as discussed above, and then recorded in the appropriate parts of the data structure. The information in the data structure, when complete, will include all of the information about which syndrome qubits belong to which clusters and the geometry thereof. This information can then be used to complete the decoding, as described above, to enable quantum error correction.

Figure 13:
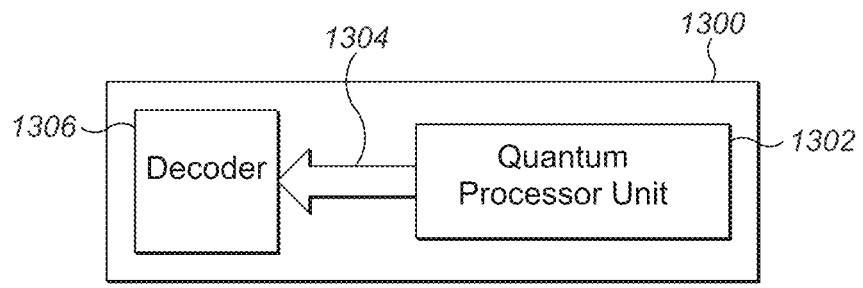
FIG. 13 shows an example embodiment of a quantum computer system.

FIG. 13 shows a quantum computer system 1300, having a quantum processor unit (QPU) 1302 which contains a plurality of data and syndrome qubits. The quantum computer system 1300 also has a decoder 1306. The QPU 1302 generates syndrome data 1304 which is sent to the decoder 1306, for decoding. The decoding can include processing of the syndrome data 1304 as described herein, to generate the data structure required to enable efficient decoding for quantum error correction. The quantum computer system 1300 can therefore be configured to execute quantum error correction to enable fault tolerant quantum computing.

Figure 14:
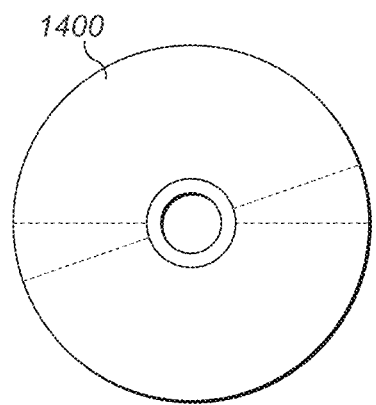
FIG. 14 shows an example embodiment of a computer program product.

FIG. 14 shows an example computer program product 1400 that contains instructions which, when executed, cause an apparatus, as described in FIG. 13, to at least perform steps of any method described above. Equivalently, there may also be provided a computer readable memory medium corresponding to the computer program product 1400.

The invention claimed is:

1. A computer-implemented quantum error correction method for use in decoding syndromes of a quantum error correction code, the syndromes comprising measurement data from a quantum computer comprising a plurality of syndrome qubits and a plurality of data qubits, the method comprising:
   receiving syndromes comprising measurement data from a quantum computer comprising a plurality of syndrome qubits and a plurality of data qubits;
   processing the syndromes to identify defects;
   recording, in a data structure, respective locations for each defect;
   determining a respective radius, for each respective defect, of a ball surrounding the respective location of the respective defect, and recording each respective radius with its respective location in the data structure, wherein each respective radius is determined by iteratively increasing a length of the respective radius until each respective radius defines a ball touching or overlapping at least one other ball surrounding another of the respective locations, such that each respective location belongs to a cluster consisting of an even number of the locations of defects;
   decoding the one or more clusters; and
   implementing an error correction wherein the data structure thereby enables decoding of the quantum error correction code.

2. The method of claim 1, wherein when at a particular iteration an odd number of the locations join a pre-existing cluster consisting of an even number of locations thereby forming a new cluster, the method further comprises, at the next iteration, increasing the length of each radius of the new cluster.

3. The method of claim 1, wherein the length of a particular radius is determined based on a number of times that the particular radius has been incrementally increased.

4. The method of claim 1, wherein the plurality of syndrome qubits form a physical array with locations of the plurality of syndrome qubits corresponding to respective positions of the plurality of syndrome qubits in a graph representation of the array.

5. The method of claim 4, wherein the length of each radius is determined according to a metric of the graph.

6. The method of claim 5, wherein the metric of the graph varies within the graph.

7. The method of claim 5, wherein the metric of the graph is an $L_1$ metric.

8. The method of claim 4, wherein each iterative increase in the length of the respective radius is an increase of half the edge length between nearest neighbor locations of the graph.

9. The method of claim 4, wherein the touching or overlapping of the ball with the other ball is determined based on the sum of the radius length of the ball and the radius length of the other ball being at least equal to the graph distance between the ball and the other ball.

10. The method of claim 1, wherein the quantum error correction code is a surface code.

11. The method of claim 10, wherein the surface code is a rotated surface code or an unrotated surface code.

12. The method of claim 1, further comprising performing error correction for each data qubit containing an error.

13. The method of claim 1, wherein the syndromes comprise multiple rounds of syndrome measurement data, and the error syndrome bits further comprise measurement data relevant to decoding measurement errors.

14. The method of claim 13, wherein the syndromes correspond to a spatio-temporal graph and the one or more clusters are configured to enable decoding of both data qubit errors and measurement errors.

15. A decoder apparatus for use in decoding a quantum error correction code from a quantum computer, the decoder apparatus configured to:
   receive syndromes comprising measurement data from a quantum computer, the quantum computer comprising a plurality of syndrome qubits and a plurality of data qubits;
   process the syndromes to identify defects;
   record, in a data structure, respective locations for each defect;
   determine a respective radius, for each respective defect, of a ball surrounding the respective location of the respective defect;
   record each respective radius in association with its respective location in the data structure, wherein each respective radius is determined by iteratively increasing a length of the respective radius until each respective radius defines a ball touching or overlapping at least one other ball surrounding another of the respective locations, such that each respective location belongs to a cluster consisting of an even number of the locations of the identified syndrome qubits, and wherein the data structure thereby comprises one or more clusters of the locations of the defects, the one or more clusters for decoding the syndromes of the quantum error correction code
   decode the one or more clusters; and
   implement an error correction.

* * * * *